(12) United States Patent
Neven et al.

(10) Patent No.: US 11,988,533 B2
(45) Date of Patent: May 21, 2024

(54) MAGNETIC CIRCUIT DEVICE FOR A MAGNETIC-INDUCTIVE FLOWMETER AND METHOD FOR MANUFACTURING A MAGNETIC CIRCUIT DEVICE

(71) Applicant: KROHNE AG, Basel (CH)

(72) Inventors: Joseph Neven, Romans (FR); Christian Paul, Rotterdam (NL)

(73) Assignee: KROHNE AG, Basel (CH)

( * ) Notice: Subject to any disclaimer, the term of this patent is extended or adjusted under 35 U.S.C. 154(b) by 92 days.

(21) Appl. No.: 17/329,232

(22) Filed: May 25, 2021

(65) Prior Publication Data
US 2021/0372835 A1    Dec. 2, 2021

(30) Foreign Application Priority Data

May 26, 2020 (DE) ...................... 10 2020 114 056.8

(51) Int. Cl.
*G01F 1/58* (2006.01)
*G01F 1/60* (2006.01)

(52) U.S. Cl.
CPC .............. *G01F 1/588* (2013.01); *G01F 1/582* (2013.01); *G01F 1/60* (2013.01)

(58) Field of Classification Search
CPC .......... G01F 1/582; G01F 1/586; G01F 1/588; H01F 27/306
See application file for complete search history.

(56) References Cited

U.S. PATENT DOCUMENTS

| | | | |
|---|---|---|---|
| 3,605,726 A | 9/1971 | Williams et al. | |
| 4,554,828 A * | 11/1985 | Doll ........................ | G01F 15/18 |
| | | | 73/861.12 |
| 8,869,628 B2 | 10/2014 | Neuburger et al. | |
| 2016/0260533 A1 | 9/2016 | Wilson | |
| 2020/0124448 A1 | 4/2020 | Neven | |
| 2020/0393276 A1 | 12/2020 | Triebenbacher et al. | |

FOREIGN PATENT DOCUMENTS

| | | |
|---|---|---|
| DE | 10050760 A1 | 4/2002 |
| EP | 1674836 A1 | 6/2006 |
| GB | 1213841 A | 11/1970 |
| WO | 0231845 A1 | 4/2002 |
| WO | 2014205164 A1 | 12/2014 |

* cited by examiner

*Primary Examiner* — Erika J. Villaluna
(74) *Attorney, Agent, or Firm* — David S. Safran; Calderon Safran & Cole, P.C.

(57) ABSTRACT

A magnetic circuit device (1) for a magnetic-inductive flowmeter, having a coil (2) that has a coil core (3). The magnetic circuit device (1) enables an increased range of application, in that it can be flexibly adapted to the geometries of the respective magnetic flow meter due to the fact that the coil core (3) is designed to be flexible in such a way that the coil (2) can be bent from a first shape into a second shape. In addition, a method (100) for manufacturing such a magnetic circuit device (1) involves the steps of provisioning, winding, heating, connecting, bending and fixing of the coil.

12 Claims, 3 Drawing Sheets

MAGNETIC CIRCUIT DEVICE FOR A MAGNETIC-INDUCTIVE FLOWMETER AND METHOD FOR MANUFACTURING A MAGNETIC CIRCUIT DEVICE

BACKGROUND OF THE INVENTION

Field of the Invention

The invention relates to a magnetic circuit device for a magnetic-inductive flowmeter, comprising a coil and a coil core arranged in the coil. The invention further relates to a coil arrangement for a magnetic circuit device. Furthermore, the invention relates to a method for manufacturing a magnetic circuit device.

Description of Related Art

A large number of magnetic circuit devices are known from the state of the art and are used to generate a homogeneous magnetic field. A magnetic field is essential for magnetic-inductive flow measurement, since the measuring principle is based on the charge separation of moving charges in a magnetic field.

Magnetic circuit devices have at least one coil that generates the magnetic field. A coil core is often arranged in the coil. The magnetic field generated is usually conducted to the pole shoes via elements conducting the magnetic field. The pole shoes are used to allow the magnetic field lines of the magnetic field to exit the magnetic circuit in a defined manner; the space between the pole shoes is permeated by the magnetic field. In magnetic-inductive flowmeters, the pole shoes are preferably implemented by pole shoe plates, which have a relatively small thickness, so that in the following they will be referred to as pole shoe plates. However, the invention is also transferable to other forms of pole shoes.

A magnetic circuit device for a magnetic-inductive flowmeter is known from European Patent Application Publication EP 2 479 541 A1 and corresponding U.S. Pat. No. 8,869,628 B2, for example. The magnetic circuit device comprises a coil and two pole plates, wherein the coil is directly connected to one pole plate and connected to the second pole plate by two arc-shaped connecting elements. The magnetic circuit device thus has an overall annular outer contour. A disadvantage of the magnetic circuit device known from the state of the art is that its possible applications are limited due to its geometrical design.

Magnetic circuit devices for magnetic-inductive flowmeters are also known from German Patent Application Publication DE 10 2017 131 202 A1 and corresponding U.S. Patent Application Publication 2020/0393276 A1, and from German Patent Application Publication DE 10 2018 125 865 A1 and corresponding U.S. Patent Application Publication 2020/0124448 A1. The magnetic circuit devices have coils and coil cores, whereby the coil cores are realized by sheet metal elements. When manufacturing the magnetic circuit device, the sheet metal elements are bent into the appropriate shape and remain in position. The finished bent magnetic circuit device is then released for assembly of the entire magnetic-inductive flowmeter, whereby during assembly of the flowmeter itself the magnetic circuit device remains in its shape. The disadvantage of this is that the magnetic circuit devices cannot be used variably, since their dimensions are fixed when the magnetic circuit devices are manufactured. The magnetic circuit devices are thus manufactured, for example, for a predetermined dimensioning of the measuring tube. In addition, the material for the magnetic circuit devices is selected in such a way that it cannot be bent out of shape after the magnetic circuit devices have been manufactured without major effort. This prevents damage to the magnetic circuit device, for example, during transport.

SUMMARY OF THE INVENTION

The object of the invention is thus to provide a magnetic circuit device and a coil arrangement for a magnetic circuit device which allow an increased range of application, in particular which can be flexibly adapted to the geometries of the respective magnetic-inductive flowmeter.

In the present invention, the object is initially and essentially achieved by the coil core being flexibly designed in such a way that the coil arrangement can be bent from a first shape into a second shape.

When it is said that the coil core is flexibly designed, it is meant that the coil core is made of a bendable material. Bendable here means that the material is selected both in terms of its thickness and its dimensions and also in terms of its material properties in such a way that it can be bent and thus a flexible coil core is implemented. In particular, this is to be understood as meaning that the coil arrangement can be bent without great effort even after it has been manufactured. The coil arrangement is explicitly designed to be bent during its assembly in an electromagnetic flowmeter and to be adapted to the dimensions of the magnetic-inductive flowmeter. Accordingly, not every material is suitable for the production of the coil core. In particular, the material must not be brittle, as the coil core would otherwise break during bending. The material must be selected in such a way that it can be bent nondestructively from a first shape into a second shape any number of times.

According to the invention, it has been recognized that the use of a flexible coil core considerably improves the possibilities for application and use of a magnetic circuit device. In particular, the assembly of a complete magnetic-inductive flowmeter can also be considerably simplified if the magnetic circuit device can be bent from one shape into another shape due to the flexibly bendable coil.

In a particularly preferred embodiment, the coil core is designed to be springy. The coil core can then not only be bent from a first shape into a second shape. Rather, the coil core is in its second form in a relaxed state and can be brought into a pretensioned state. The coil core can preferably be fixed or held in the pretensioned state. If the fixation or mounting is omitted, the coil core returns to its relaxed state.

According to the invention, it has been recognized that a soft material is particularly suitable as the material for the coil core. In a particularly preferred design, the coil core is made of a nickel-iron alloy. In a very particularly preferred embodiment, the coil core is made of a nickel-iron alloy comprising 50 percent nickel and 50 percent iron. However, the invention is not limited to this composition. In further preferred embodiments, the iron content is greater than 50 percent or less than 50 percent.

In a further embodiment, the coil core is made of soft iron.

In addition to the type of material of the coil core, the dimensions or the geometry of the coil core are also of considerable importance for the invention. In a particularly preferred variation, the coil core has a length which is greater than eight times the diameter of the coil core. With such a coil core, a so-called long coil can be implemented with appropriate winding. A long coil is thus a coil whose length is considerably greater than its diameter. Especially such coils are preferred where the length of the coil is at least eight times the diameter. Long coils have the advantage over short coils, whose length is of the same order of magnitude as the coil radius, that the magnetic field inside the coil is homogeneous, or significantly more homogeneous than the magnetic field inside a short coil. In addition, long coils have significantly lower unwanted stray fields. This minimizes energy losses due to stray fields. The susceptibility to stray fields can be reduced by using long coils. Due to the significantly lower stray fields, shielding measures for shielding the stray fields can be simplified or the use of shielding measures for shielding the stray fields can be dispensed of.

In a particularly preferred design, the coil core has a diameter of 2.5 mm and a length of 20 mm. The coil core is further preferably implemented by a wire with a preferably round cross-section.

In order to achieve the highest possible fill factor when winding the coil, a special design of the magnetic circuit device according to the invention provides for the coil to be wound orthocyclically. An orthocyclic winding is characterized in that the windings of an upper winding layer are arranged in the valleys of a lower winding layer.

In a preferred variation, the coil is made of insulated coil wire. It is particularly preferred that the coil be made of insulated copper wire. Copper wire is characterized by very good electrical conductivity.

According to the invention, it has been recognized that the flexibility of the coil arrangement is further increased in that the insulation of the coil wire is at least partially melted by heating after the coil is wound. After cooling, the coil arrangement exhibits an increased degree of flexibility compared to before heating. This is achieved in that heating the insulated wire destroys part of the insulation, thus reducing the thickness of the insulation layer.

As described in the introduction, a magnetic circuit device usually has two pole plates between which a magnetic field is formed. In a particularly preferred design, the flexible coil core is at least indirectly connected to the pole plates. If it is said that the coil core is at least indirectly connected to the pole plates, then yoke elements guiding the magnetic field generated by the coil can be provided in particular, which connect the coil core to the pole shoes. However, in order to not reduce the flexibility of the magnetic circuit device by means of—in particular rigidly constructed—yoke elements, it is provided in a particularly preferred variation that the coil core is directly connected to the pole plates. This can be achieved, for example, by welding the ends of the coil core to the pole plates. Here, however, other means of connection known from the state of the art can also be used. In such a design, only the pole plates are rigid. The connection between the two pole plates, which is implemented solely by the coil or the coil core, is flexible, so that the two pole plates can be brought into a variety of relative arrangements to each other by bending the coil.

In addition to the magnetic circuit device, the invention also relates to a coil arrangement for a magnetic-inductive flowmeter, which comprises a coil and a coil core arranged in the coil. In the case of the coil arrangement, the object forming the basis of the invention is achieved in that the coil core is designed flexibly in such a way that the coil arrangement can be bent from a first shape into a second shape. For the preferred configuration of the coil arrangement according to the invention, all preferred configurations of the coil arrangement described with respect to the magnetic circuit device according to the invention apply accordingly.

In addition, the invention relates to a method for manufacturing a magnetic circuit device for a magnetic-inductive flowmeter, wherein the magnetic circuit device comprises a coil with a coil core and two pole plates. The method according to the invention is characterized in that, in a provisioning step, the coil core of a flexible material is provided, that, in a winding step, N windings of insulated coil wire are wound around the coil core and that, in a connecting step, the coil core is connected to the pole plates.

According to the invention, it has been recognized that by providing a flexible coil core, the magnetic circuit device can be flexibly implemented. This makes it possible to bend the coil of the magnetic circuit device from a first shape into a second shape. A corresponding magnetic circuit device can thus be optimally adapted to the geometric conditions of the magnetic-inductive flowmeter, even in retrospect.

In a particularly preferred further development, the coil is heated in a heating step in such a way that the insulation of the coil wire at least partially melts. It has been recognized that the flexibility of the coil of the magnetic circuit device and thus the flexibility of the magnetic circuit device can be further increased by a heating step.

The heating step can be implemented in different ways. In a preferred variation, the heating step is implemented by passing a current through the coil wire. The current intensity is selected in such a way that the insulation of the coil wire is at least partially melted by the heating process.

In an alternative variation, the heating step is implemented by inductive heating.

A further development of the method according to the invention is characterized in that, in an additional bending step, the magnetic circuit device is bent from a first shape into a second shape. The additional bending step is preferably performed after the connecting step. In an alternative variation, the bending step is carried out before the connecting step, i.e., before the coil core is at least indirectly connected to the pole shoe plates.

In a further method step, in a further version of the method according to the invention, the magnetic circuit device is fixed in a final shape in a fixing step. A fixing means is used for this purpose. In particular, the ends of the coil core are fixed in a final shape in the fixing step. This variation has the advantage that once the magnetic circuit device has been bent into a final shape, it can no longer be accidentally bent again. In the final shape of the magnetic circuit device, the magnetic field preferably exhibits the greatest possible homogeneity and the desired magnetic field strength.

In detail, there is a plurality of possibilities for designing and further developing the magnetic circuit device according to the invention, the coil according to the invention and the method according to the invention as will be apparent from the description of preferred embodiments in conjunction with the accompanying drawings.

DETAILED DESCRIPTION OF THE INVENTION

Figure 1:
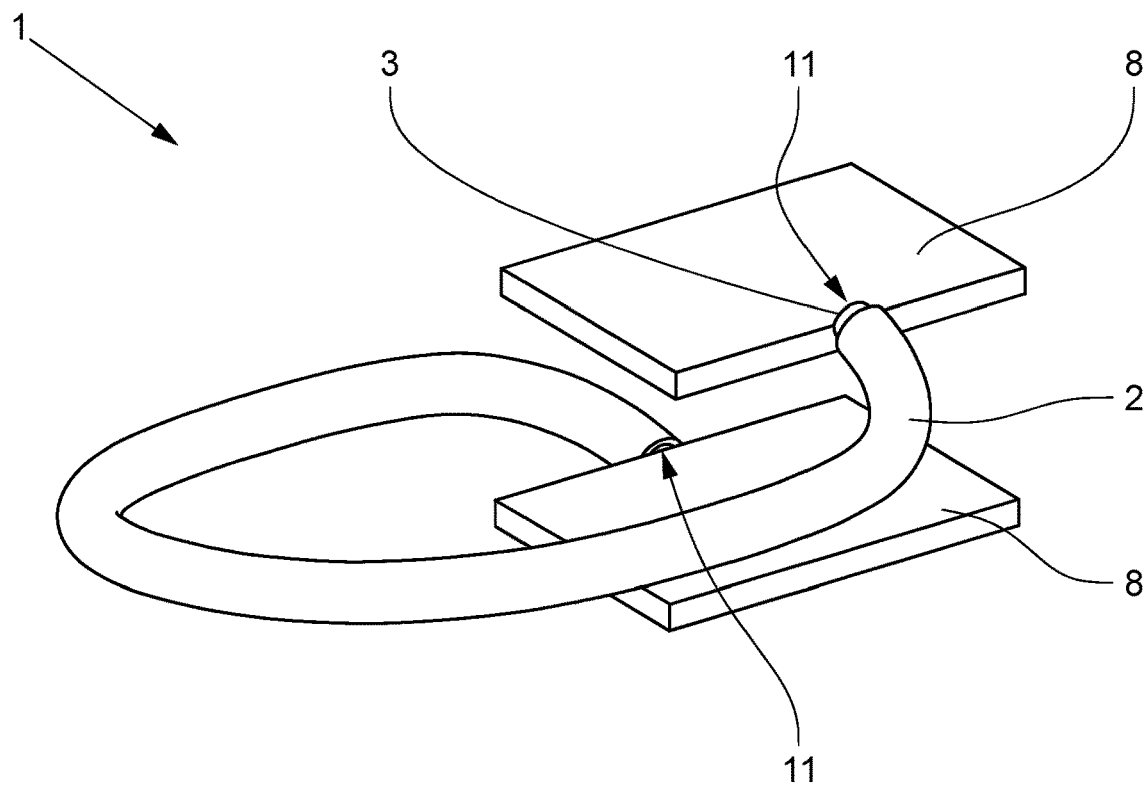
FIG. 1 shows a first embodiment of a magnetic circuit device.

FIG. 1 shows a magnetic circuit device 1 for a magnetic-inductive flowmeter, which itself is not shown. The magnetic circuit device 1 has a coil 2. The coil 2 is made of windings of insulated copper wire wound around a coil core 3. The coil core 3 arranged in the coil 2 is flexibly designed in such a way that the coil arrangement comprised of coil 2 and coil core 3 can be bent from a first shape into a second shape. In the embodiment shown, the coil core is made of a nickel-iron alloy. Nickel-iron alloys are very soft metal alloys which facilitate bending of the coil core 3. When choosing the material of the coil core 3, it is important that the material is not destroyed during bending, for example, that it breaks. In addition, the nickel-iron alloy used has a high permeability and is therefore particularly suitable as material for coil core 3.

Figure 2A:
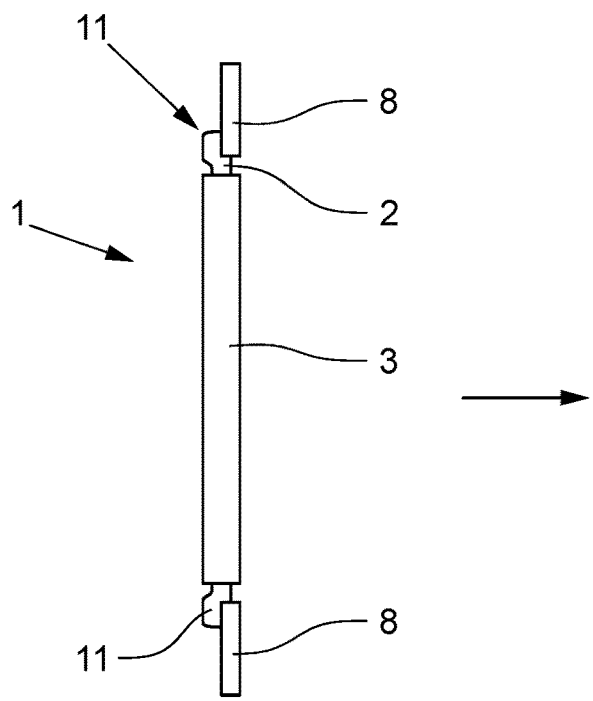
FIG. 2a shows a second magnetic circuit device in a first shape.
Figure 2B:
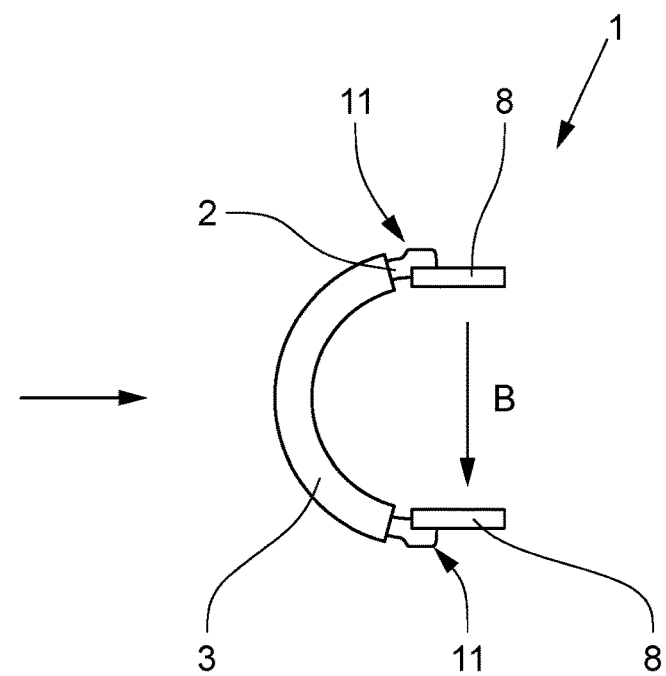
FIG. 2b shows the magnetic circuit device from FIG. 2a in a second shape.

In FIGS. 2a and 2b a magnetic circuit device 1 is shown, wherein, in the illustration of FIG. 2a, the coil arrangement of the coil 2 and the coil core 3 is bent in a first shape and, in FIG. 2b, the coil arrangement of the coil 2 and the coil core 3 is bent in a second shape. In FIG. 2a, the coil extends along its longitudinal axis, wherein the longitudinal axis corresponds to the coil axis. In FIG. 2b, the coil arrangement is bent into a U-shape. This is possible due to the flexibility of the coil core 3. In the embodiment shown, the coil core 3 has such flexibility that the coil arrangement consisting of the coil 2 and the coil core 3 can be bent (plastically deformed) from one shape into another shape, but remains in the shape after the bending process.

Figure 3:
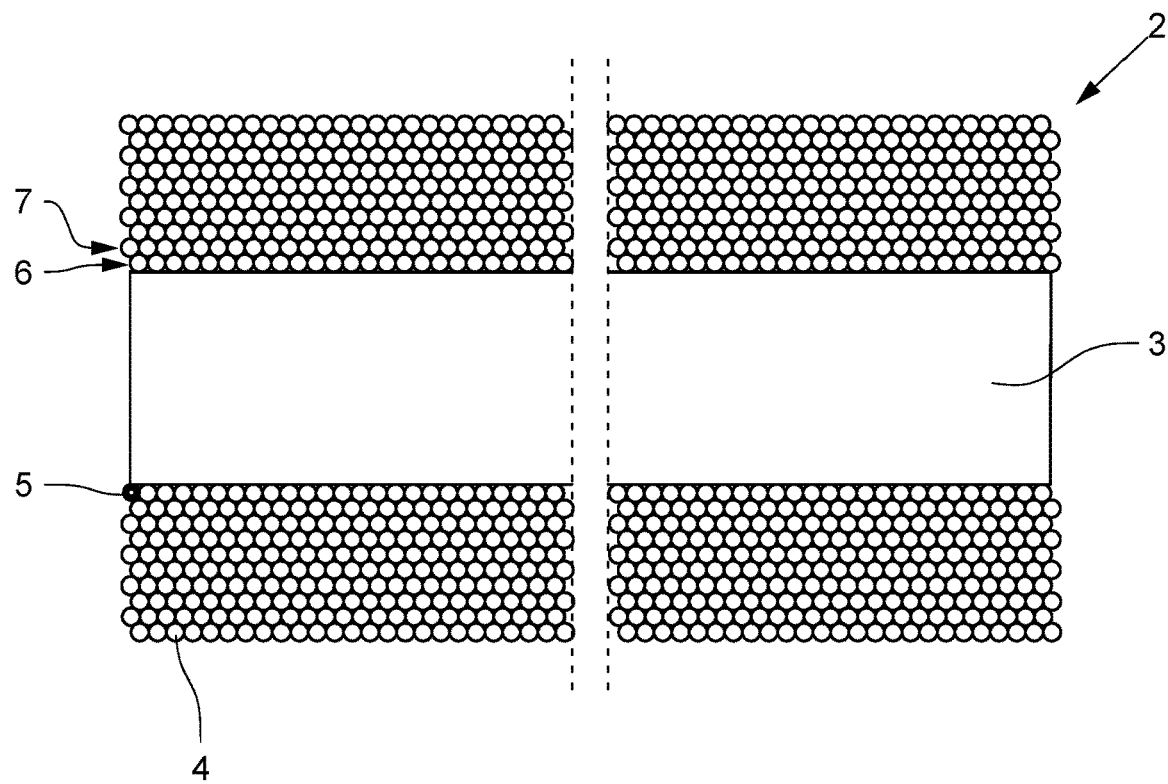
FIG. 3 shows a third embodiment of a magnetic circuit device.

To implement a long coil 2, the coil core 3 has a length L which is at least eight times the thickness D of the coil core. The coil core 3 is wound with a coil wire 4, wherein the coil wire 4 has a thickness d. A cross-section through a wound coil 2 is shown in FIG. 3. Here, the coil core 3 is shown with its thickness D and length L, which is wound with coil wire 4. The coil wire 4 has an insulation 5, which is only shown very schematically in a single coil wire cross-section for reasons of clarity.

The coil 2 is orthocyclically wound so that a maximum fill factor is achieved. In orthocyclic winding, the windings of one winding layer 6 are located in the valleys of the previous winding layer 7. The coil shown in FIG. 3 has 10 winding layers. One winding position has 100 windings, so that the coil shown has a total of 1000 windings. For the sake of clarity, only part of the coil 2 is shown.

The coil core has a thickness D of 2.5 mm and a length L of 20 mm. The coil wire 4 has a thickness d of 0.2 mm With such a design, the coil wire 4 has a corresponding approximate length of 14 m. This is a particularly elegant way of creating a thin, long coil with a minimal stray field and minimal energy loss.

After winding, the coil 2 is warmed by heating, which at least partially melts the insulation 5. Thus the flexibility of the coil 2 is increased. After the coil 2 is thus cooled down again, it has a higher flexibility than before the heating process.

Figure 4:
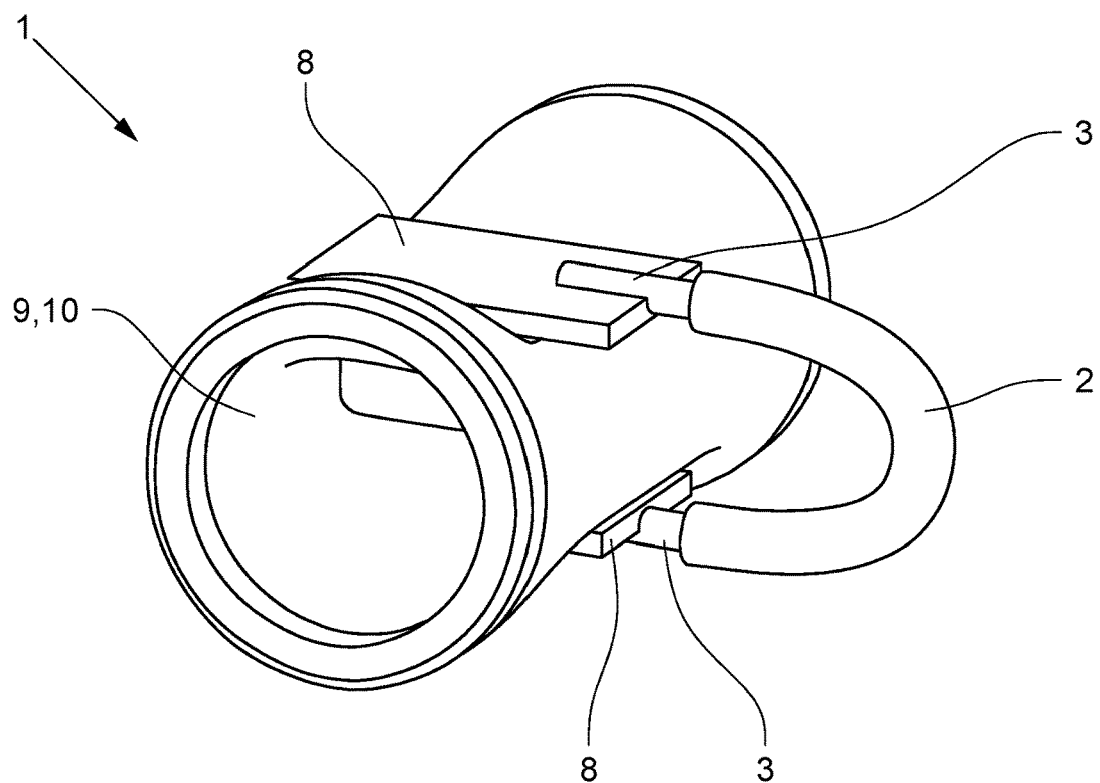
FIG. 4 is a schematic diagram of a coil of a magnetic circuit device.

As can be seen in FIGS. 1, 2a, 2b and 4, the magnetic circuit device 1 has two pole plates 4 just like the coil arrangement. The magnetic field B of the coil 2 is created between the pole plates 8. The measuring tube 9 of the magnetic-inductive flow meter is arranged between the pole plates 8, as shown in FIG. 4. The electrically conductive medium to be measured flows through the measuring tube 9. The measuring tube 9 is also used as a fixing means 10 to fix the bent coil arrangement in its final shape.

The coil core 3 of the coil 2 is directly connected to the pole plates 8 in the configurations shown. This is achieved by welding the ends 11 of the coil core 3 to the pole plates 8.

Figure 5:
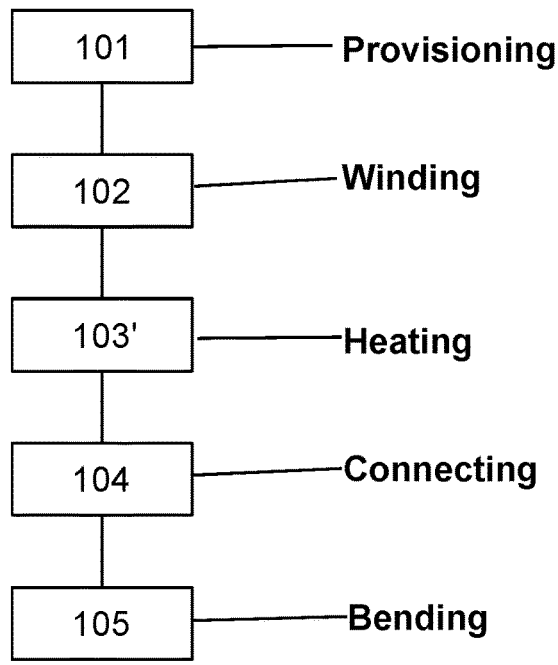
FIG. 5 is a block diagram of a first method of mounting a magnetic circuit device.

FIG. 5 shows a block diagram of a method 100 for manufacturing a magnetic circuit device 1. In a provisioning step 101, a flexible coil core is provided. When a flexible coil core is mentioned, it is a coil core which is made of a flexible material and has a geometry which allows the coil core to be bent. In a winding step 102 following the provisioning step 101, N windings of insulated coil wire are wound around the coil core. In a heating step 103, the coil is heated in such a way that the insulation of the coil wire at least partially melts. This increases the flexibility of the cooled coil. In the illustrated version of the method 100, the heating step 103 is achieved by passing a current through the coil. The type of heating step 103 is marked with the reference symbol 103'. In a connecting step 104, the coil core is connected to the pole plates. This is implemented in the present case by welding the ends of the coil core to the pole plates. In addition, the connecting step 104 is followed by a bending step 105, in which the coil arrangement or the magnetic circuit device is bent into a final shape.

Figure 6:
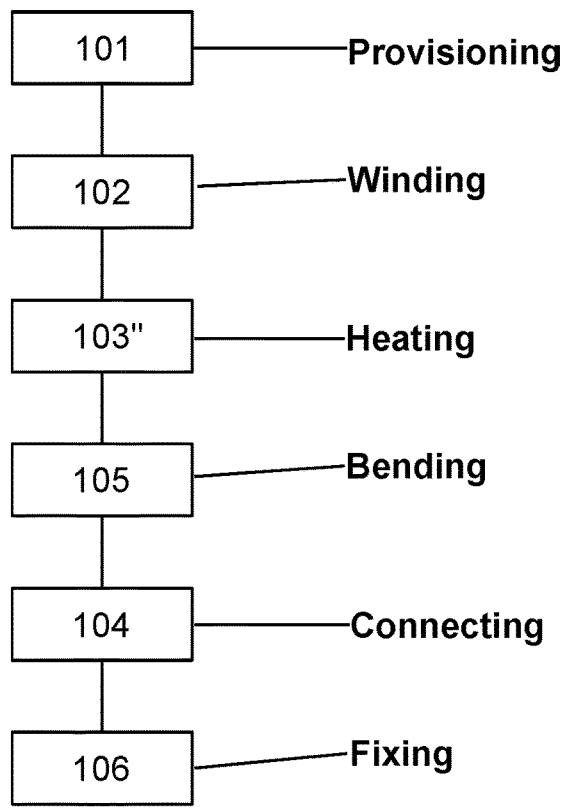
FIG. 6 is a block diagram of a second method of mounting a magnetic circuit device.

A variation of the method 100 is shown in FIG. 6. The method shown here differs in that the heating step is implemented by inductive heating, which is illustrated by the reference symbol 103". In addition, the bending step 105 is carried out before the connecting step 104. In a final fixing step 106, the ends of the coil core are fixed in their final shape by means of a fixing means. This prevents the bent magnetic circuit device from being unintentionally bent into a different shape, which could possibly change the magnetic field that is formed.

REFERENCE NUMBERS

1 Magnetic circuit device
2 Coil
3 Coil core
4 Coil wire
5 Insulation
6 Winding layer
7 Winding layer on the previous winding layer 6
8 Pole plates
9 Measuring tube
10 Fixing means
11 Ends of the coil core
  100 Method
  101 Provisioning step
  102 Winding step
  103 Heating step
  103' Heating step using coil current
  103" Heating step using inductive heating
  104 Connecting step
  105 Bending step
  106 Fixing step

What is claimed is:
1. A magnetic circuit device for a magnetic-inductive flowmeter, comprising:
a coil arrangement comprising a coil, a coil core arranged in the coil and further comprising two pole plates, wherein the coil core is flexible, such that the coil arrangement is bendable from a first shape into a second shape, and wherein the coil core is connected directly to the pole plates by ends of the coil core having been welded to the pole plates.

2. The magnetic circuit device according to claim 1, wherein the coil core is springily configured, and wherein the coil core in its second shape is in a relaxed state and can be brought into a preloaded state.

3. The magnetic circuit device according to claim 1, wherein the coil core is made of a nickel-iron alloy or of a soft iron composition.

4. The magnetic circuit device according to claim 1, wherein the coil core has a length L which is greater than eight times the diameter D of the coil core.

5. The magnetic circuit device according to claim 4, wherein the coil is orthocyclically wound.

6. The magnetic circuit device according to claim 1, wherein the coil is an insulated coil wire, and wherein the coil wire has insulation that has been at least partially melted by heating after the coil has been wound in such a way that the coil has a flexibility which is increased relative to the flexibility of the coil prior to heating.

7. A coil arrangement for a magnetic circuit device for a magnetic-inductive flow meter, comprising a coil, a coil core arranged in the coil and further comprising two pole plates, the coil core being flexible such that the coil arrangement is bendable from a first shape into a second shape and the coil core being connected directly to the pole plates by ends of the coil core having been welded to the pole plates.

8. The coil arrangement according to claim 7, wherein the coil arrangement has at least one of:

a springy configuration, and wherein the coil core in its second shape is in a relaxed state and can be brought into a preloaded state, a nickel-iron alloy, or soft iron composition, a length L which is greater than eight times the diameter D of the coil core, or an insulated coil wire, the insulation of which has been at least partially melted by heating after the coil has been wound in such a way that the coil has a flexibility which is increased relative to the flexibility of the coil prior to heating.

9. A method for manufacturing a magnetic circuit device for a magnetic-inductive flowmeter, wherein the magnetic circuit device comprises a coil with a coil core and two pole plates, the method comprising:

providing a flexible coil core in a provisioning step, winding N windings of insulated coil wire around the coil core, directly connecting the coil core to the pole plates, and heating the coil such that the insulation of the coil wire at least partially melts.

10. The method according to claim 9, wherein the heating is implemented by passing a current through the coil wire or by inductive heating.

11. The method according to claim 9, comprising the further step of bending the magnetic circuit device from a first shape into a second shape.

12. The method according to claim 11, comprising the further step of fixing ends of the coil core in a final shape by a fixing means.

* * * * *